United States Patent Office
3,592,819
Patented July 13, 1971

3,592,819
BIS-BASIC ETHERS AND THIOETHERS OF FLU-
ORENONE, FLUORENOL AND FLUORENE
Robert W. Fleming, Cincinnati, Ohio, David L. Wenstrup,
Covington, Ky., and Edwin R. Andrews, Cincinnati,
Ohio, assignors to Richardson Merrell Inc., New York,
N.Y.
No Drawing. Filed Dec. 30, 1968, Ser. No. 788,038
Int. Cl. C07d 29/36
U.S. Cl. 260—294.7C                27 Claims

ABSTRACT OF THE DISCLOSURE

Novel bis-basic ethers and thioethers of fluorenone, fluorenol and fluorene selected from a base of the formula

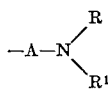

wherein: Z is oxygen, $H_2$ or H,OH; each Y is oxygen or sulfur; and each X is
(A) the group

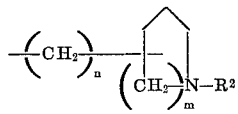

wherein A is alkylene of 2 to about 8 carbon atoms and separates the amino nitrogen thereof and Y by an alkylene chain of at least 2 carbon atoms, each R and $R^1$ is hydrogen, (lower)alkyl, cycloalkyl of 3 to 6 ring carbon atoms, alkenyl of 3 to 6 carbon atoms having the vinyl unsaturation in other than the 1-position of the alkenyl group, or each set of R and $R^1$ taken together with the nitrogen to which they are attached is pyrrolidino, piperidino, N-(lower)alkylpiperazino, or morpholino; or each X is
(B) the group wherein $n$ is an integer of 0 to 2, $m$ is 1 or 2 and $R^2$ is hydrogen, (lower)alkyl, or alkenyl of 3 to 6 carbon atoms having the vinyl unsaturation in other than the 1-position of the alkenyl group; or a pharmaceutically acceptable acid addition salt of said base.

These compounds can be used as pharmaceuticals for preventing or inhibiting a viral infection.

---

This invention relates to novel bis-basic ethers and thioethers of fluorenone, fluorenol and fluorene, their method of preparation and use as antiviral agents. Further, many of the compounds of this invention can be used as intermediates. Thus, the fluorenones can be reduced to the corresponding fluorenols and fluorenes whereas the fluorenols can be reduced to fluorenes. Also, the ethers, i.e., when Y is oxygen, of fluorene and fluorenol can be oxidized to the corresponding fluorenone.

The compounds of this invention include both the base form and pharmaceutically acceptable acid addition salts of the base form wherein the base form can be represented by the formula

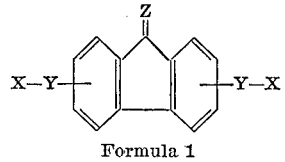

Formula 1 wherein: Z is O, $H_2$ or H,OH; each Y is oxygen or sulfur; and each X is
(A) the group

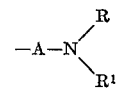

wherein A is alkylene of 2 to about 8 carbon atoms and separates the amino nitrogen thereof and Y by an alkylene chain of at least 2 carbon atoms, each R and $R^1$ is hydrogen, (lower)alkyl, cycloalkyl of 3 to 6 ring carbon atoms, alkenyl of 3 to 6 carbon atoms having the vinyl unsaturation in other than the 1-position of the alkenyl group, or each set of R and $R^1$ taken together with the nitrogen to which they are attached is pyrrolidino, piperidino, N-(lower)alkylpiperazino, or morpholino; or each X is
(B) the group

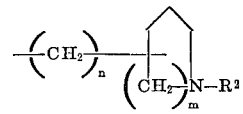

wherein $n$ is an integer of 0 to 2, $m$ is 1 or 2 and $R^2$ is hydrogen, (lower)alkyl, or alkenyl of 3 to 6 carbon atoms having the vinyl unsaturation in other than the 1-position of the alkenyl group.

The compounds of this invention can be (a) fluorenones when Z is oxygen; (b) fluorenols when Z is H,OH; and (c) fluorenes when Z is $H_2$ as can be shown by the following formulas, respectively, wherein Y and X have the meaning given hereinbefore:

(a)

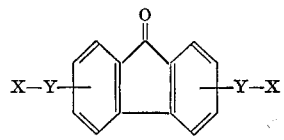

(b)

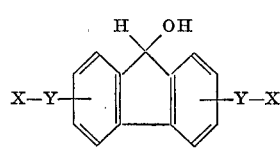

and (c)

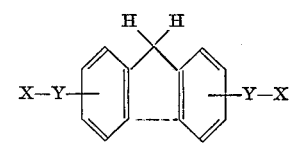

It can be seen that the compounds are ethers when Y is oxygen and thioethers when Y is sulfur. Although one of the two Y groups on a compound of the above Formula 1, or Formulas 2 and 3, given hereinafter, can be oxygen and the other sulfur, it is preferred that both Y groups are the same and particularly that each Y group is oxygen.

The basic ether or thioether groups, i.e., —Y—X of Formula 1, can be linked to the tricyclic ring system of the fluorenone, fluorenol or fluorene by replacement of any of the four hydrogens of the benzenoid ring to which such group is attached. Thus, one of these groups can be in any of the positions of 1 through 4 of the tricyclic ring system and the other can be in any of the positions 5 through 8. Preferably, one of the basic ether or thioether groups is in the 2- or 3-position of the tricyclic ring system and the remaining ether or thioether group is in the 5-, 6- or 7- position of the tricyclic ring system and particularly when one of these groups is in the 2-position and the other is in the 7-position.

It can be seen from the above Formula 1 and its description that the compounds can have structures wherein each X is the group

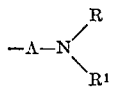

as more fully shown by the following generic Formula 2 or wherein X is the group

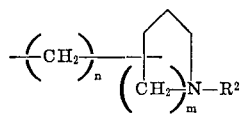

as more fully shown by generic Formula 3 below:

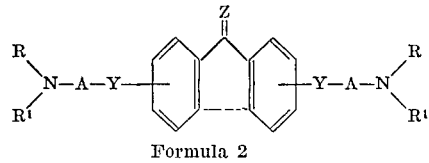

Formula 2 or

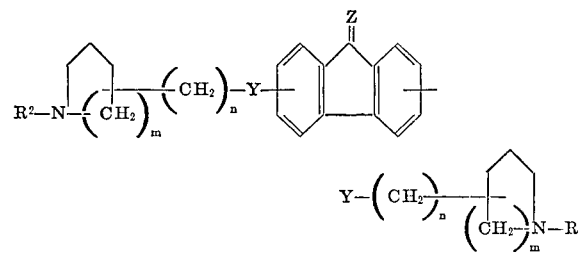

Formula 3

In the above generic Formulas 2 and 3, the various groups have the meanings given hereinbefore, i.e., Z is O, $H_2$ or H,OH; each Y is O or S; A is alkylene of 2 to 8 carbon atoms and separates Y and the amino nitrogen by an alkylene chain of at least 2 carbon atoms, and the like.

Each of the letters A in the above Formula 2 is an alkylene group having from 2 to about 8 carbon atoms which can be straight chained or branched chained and which separates Y, i.e., the ether oxygen or thioether sulfur, from the amino nitrogen by an alkylene chain of at least 2 carbon atoms, i.e., the oxygen (or sulfur) and amino nitrogen are not on the same carbon atom of the alkylene group. Each of the alkylene groups as represented by A can be the same or different. Preferably both of these groups are the same. Illustrative of alkylene groups as represented by A there can be mentioned: 1,2-ethylene; 1,3-propylene; 1,4-butylene; 1,5-pentylene; 1,6-hexylene; 2-methyl-1,4-butylene; 2-ethyl-1,4-butylene; 3-methyl-1,5-pentylene and the like. Preferably A is alkylene having from 2 to 6 carbon atoms.

Each amino group, i.e.,

of Formula 2, can be a primary, secondary or tertiary amino group. Each of R and $R^1$ can be hydrogen, (lower) alkyl, cycloalkyl of 3 to 6 carbon atoms, alkenyl of 3 to 6 carbon atoms having the vinyl unsaturation in other than the 1-position of the alkenyl group, or each set of R and $R^1$ taken together with the nitrogen atom to which they are attached is a saturated monocyclic heterocyclic group. Preferably, each of the amino groups as represented by

is a tertiary amino group.

The term (lower)alkyl as used herein relates to alkyls having from 1 to 6 carbon atoms. Illustrative of (lower) alkyls as can be represented by each R or $R^1$ in Formula 2 or $R^2$ in Formula 3 there can be mentioned straight or branched chain alkyls such as methyl; ethyl; n-propyl; isopropyl; n-butyl; secondary butyl; tertiary butyl; isoamyl; n-pentyl; n-hexyl; and the like.

Illustrative of cycloalkyl groups as represented by each of R and $R^1$ there can be mentioned: cyclopropyl; cyclobutyl; cyclopentyl; cyclohexyl; and the like.

Illustrative of alkenyl groups as can be represented by R, $R^1$ or $R^2$, there can be mentioned: allyl; 3-butenyl; 4-hexenyl; and the like.

The heterocyclic groups of each set of R and $R^1$ together with the nitrogen atom to which they are attached can be a saturated monocyclic heterocyclic group such as those generally equivalent to di(lower)alkylamino groups in the pharmaceutical arts. Illustratively, such groups, in addition to the one nitrogen atom, can contain a second hetero atom, i.e., oxygen, sulfur or nitrogen, in the ring, and 4 or 5 ring carbon atoms. The ring can be substituted with a (lower)alkyl group, particularly such an alkyl group having from 1 to 3 carbon atoms. Illustrative of specific heterocyclic groups as represented by R and $R^1$ together with the nitrogen atom to which they are attached, there can be mentioned: piperidino, pyrrolidino, morpholino, N-(lower)alkylpiperazino such as N-methyl or N-ethylpiperazino, and the like.

Each R, $R^1$ or $R^2$ group can be the same or different on each of the basic ether or thioether groups of the tricyclic ring system. Preferably, however, both of the R groups, $R^1$ groups or $R^2$ groups on each compound are the same. Preferred substituents for the R, $R^1$ and $R^2$ groups are the (lower)alkyls and particularly (lower) alkyls of 1–6 carbon atoms.

Each of the saturated heterocyclic groups of the above Formula 3 can be attached to Y through an alkylene linkage of 1 or 2 carbon atoms, e.g., methylene, or 1,2-ethylene, or the saturated heterocyclic group can be attached to Y through a ring carbon atom of such heterocyclic group when $n$ is zero. The saturated heterocyclic group is attached to the alkylene group or Y through a carbon atom of such ring by replacement of one of the hydrogen atoms of the ring. The heterocyclic groups in the Formula 3 compounds can be 5- or 6-membered rings, i.e., $m$ is 1 or 2. The $R^2$ group can be the same as the R or $R^1$ groups of the Formula 2 compounds, except for cycloalkyl or heterocyclic groups. Illustrative of various groups as represented by

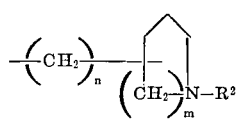

there can be mentioned: N-methyl-4-piperidyl, N-methyl-3-piperidyl, N-ethyl-3-pyrrolidyl, N-methyl-4-piperidylmethyl, N-methyl-3-piperidylmethyl, 2-piperidylethyl, and the like.

Illustrative of base compounds of this invention as represented by generic Formula 2 there can be mentioned:

2,7-bis(4-aminobutoxy)fluoren-9-one;
2,7-bis(4-aminobutylthio)fluoren-9-one;
3,6-bis[2-(diethylamino)ethoxy]fluoren-9-one;
2,5-bis[3-(diethylamino)propoxy]fluoren-9-one;
3,6-bis[3-(dibutylamino)propoxy]fluoren-9-one;
2,6-bis[3-(diethylamino)propoxy]fluoren-9-one;
2,7-bis[5-(dipropylamino)pentoxy]fluoren-9-one;
3,6-bis[3-(cyclohexylamino)propoxy]fluoren-9-one;
2,7-bis[6-(diallylamino)hexoxy]fluoren-9-one;
3,6-bis[3-(pyrrolidino)propoxy]fluoren-9-one;
2,7-bis[3-(pyrrolidino)propylthio]fluoren-9-one;
2,5-bis[2-(N-methyl-N-cyclohexylamino)ethoxy]fluoren-9-one;

the corresponding fluorenol and fluorene derivatives of the above enumerated bases; and the like. Illustrative of base compounds of this invention as represented by the generic Formula 3, there can be mentioned:

2,7-bis[2-(N-methyl-4-piperidyl)ethoxy]fluoren-9-one;
2,7-bis[2-(N-methyl-4-piperidyl)ethylthio]fluoren-9-one;
3,6-bis(N-methyl-4-piperidyloxy)fluoren-9-one;
2,7-bis(N-ethyl-3-pyrrolidyloxy)fluoren-9-one;
2,6-bis(N-allyl-4-piperidylmethoxy(fluoren-9-one;

and the like.

Preferred compounds of this invention are fluorenones of the formula

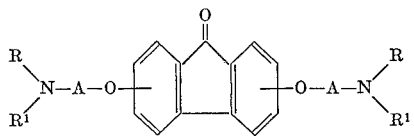

wherein: one of the basic ether groups is in the 2- or 3-position of the fluorenone ring system and the other is in the 5-, 6- or 7-position; each A is alkylene of 2 to 6 carbon atoms and each

group is a tertiary amine as mentioned hereinbefore, particularly when each R and R¹ is (lower)alkyl of 1 to 5 carbon atoms; and pharmaceutically acceptable acid addition salts thereof.

The compounds of this invention, also simply referred to as active ingredients, can be administered to animals, such as warm-blooded animals and particularly mammals, for their prophylactic or therapeutic antiviral effects by conventional modes of administration, either alone, but preferably with pharmaceutical carriers.

Illustratively, administration can be parenterally, e.g., subcutaneously, intravenously, intramuscularly or intraperitoneally, or topically, e.g., intranasally or intravaginally. Alternatively or concurrently, administration can be by the oral route.

The dosage administered will be dependent upon the virus for which treatment or prophylaxis is desired, the type of animal involved, its age, health, weight, extent of infection, kind of concurrent treatment, if any, frequency of treatment and the nature of the effect desired. Illustratively, dosage levels of the administered active ingredients can be: intravenous, 0.1 to about 10 mg./kg.; intraperitoneal, 0.1 to about 50 mg./kg.; subcutaneous, 0.1 to about 250 mg./kg.; orally, 0.1 to about 500 mg./kg. and preferably about 1 to 250 mg./kg.; intranasal instillation, 0.1 to about 10 mg./kg.; and aerosol, 0.1 to about 10 mg./kg. of animal (body) weight.

The active ingredients, together with pharmaceutical carriers, can be employed in unit dosage forms such as solids, e.g., tablets, capsules, powder packets, or liquid solutions, suspensions, or elixirs for oral administration and ingestion or liquid solutions for parenteral use. The quantity of active ingredient in the dosage will generally differ depending on the type of unit dosage, the type of animal, and its weight. Thus, each unit dosage can contain from about 1 milligram (mg.) to about 30 grams of active ingredient and preferably from about 25 to 5000 mg. of active ingredients in a pharmaceutical carrier.

The solid unit dosage forms can be of the conventional type. Thus, the solid carrier can be a capsule which can be of the ordinary gelatin type. In the capsule there can be from about 10% to about 90% by weight of active ingredient and from 90% to 10% of a carrier, e.g., lubricant and inert fillers such as lactose, sucrose, corn starch, and the like. In another embodiment, the active ingredient is tabletted with conventional carriers, e.g., binders such as acacia, corn starch or gelatin, disintegrating agents such as corn starch, potato starch, or alginic acid, and a lubricant such as stearic acid, or magnesium stearate. In yet another embodiment, the active ingredient is put into powder packets and employed. These solid unit dosages will generally contain from about 5% to 95% of the active ingredient by weight of the unit dosage and preferably from about 20% to 90% by weight thereof. The solid unit dosage forms will generally contain from about 1 mg. to about 30 grams of the active ingredient and preferably from about 25 mg. to about 5000 mg. of the active ingredient.

The pharmaceutical carrier can, as previously indicated, be a sterile liquid such as water and oils, with or without the addition of a surfactant. Illustrative of oils there can be mentioned those of petroleum, animal, vegetable or synthetic origin, e.g., peanut oil, soybean oil, mineral oil, sesame oil, and the like. In general, water, saline, aqueous dextrose, and related sugar solutions and glycols such as propylene glycol or polyethylene glycol are preferred liquid carriers, particularly for injectable solutions. Sterile injectable solutions such as saline, e.g., isotonic saline, will ordinarily contain from about 0.5% to 25% and preferably from about 1 to 10% by weight of the active ingredient in the composition.

As mentioned above, oral administration can be in a suitable suspension or syrup, in which the active ingredient orinarily will constitute from about 0.5% to 10%, and preferably from about 1% to 5%, by weight. The pharmaceutical carrier in such composition can be a watery vehicle such as an aromatic water, a syrup or a pharmaceutical mucilage; also, a suspending agent for viscosity control such as magnesium aluminum silicate, carboxymethylcellulose or the like as well as a buffer, preservative, etc.

The active ingredients can also be admixed in animal feed or incorporated into the animal's drinking water. For most purposes, an amount of active ingredient will be used to provide from about 0.0001% to 0.1% by weight of the active ingredient based on the total weight of feed intake. Preferably, from 0.001% to 0.02% by weight will be used. The selection of the particular feed is within the knowledge of the art and will depend, of course, on the animal, the economics, natural materials available, and the nature of the effect desired.

The active ingredients can be admixed in animal feed concentrates, suitable for preparation and sale to farmers or livestock growers for addition to the animal's feedstuffs in appropriate proportion. These concentrates can ordinarily comprise about 0.5% to about 95% by weight of the active ingredient compounded together with a finely divided solid, preferably flours, such as wheat, corn, soya bean and cottonseed. Depending on the recipient animal, the solid adjuvant can be ground cereal, charcoal, fuller's earth, oyster shell and the like. Finely divided attapulgite and bentonite can also be used.

For use as aerosols the active ingredients can be packaged in a pressurized aerosol container together with a gaseous or liquefied propellant, e.g., dichlorodifluoromethane, carbon dioxide, nitrogen, propane, etc. with the usual adjuvant such as co-solvents, and wetting agents, as may be necessary or desirable.

Inter alia, the active ingredients induce the formation of interferon when host cells are subjected to such ingredients, e.g., contact of an active ingredient with tissue culture or administration to animals. Thus, these active ingredients can be used as antiviral agents for inhibiting or preventing a variety of viral infections by administering such an ingredient to an infected animal, e.g., warm-blooded anmal, such as a mammal, or to such animal prior to infection. Illustratively, the compounds can be administered to prevent or inhibit infections of: picornaviruses, e.g., encephalomyocarditis; myxoviruses, e.g., Influenza $A_0$ $PR_8$; arboviruses, e.g., Semliki Forest; and poxviruses, e.g., Vaccinia, IHD. When administered prior to infection, i.e., prophylactically, it is preferred that the administration be within 0 to 96 hours prior to infection of the animal with pathogenic virus. When administered therapeutically to inhibit an infection, it is preferred that the administration be within about a day or two after infection with pathogenic virus.

The following schemes represent methods which can be used to prepare the compounds of this invention.

Scheme 1

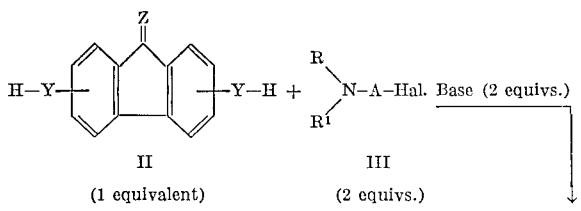

Scheme 2

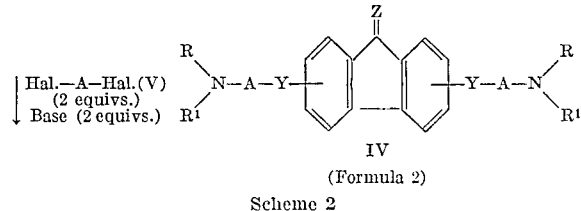

Scheme 3

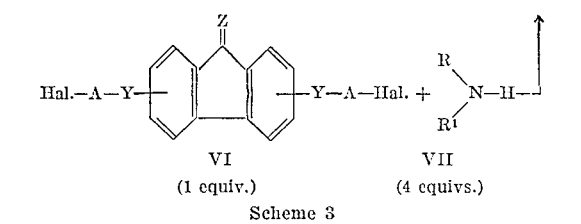

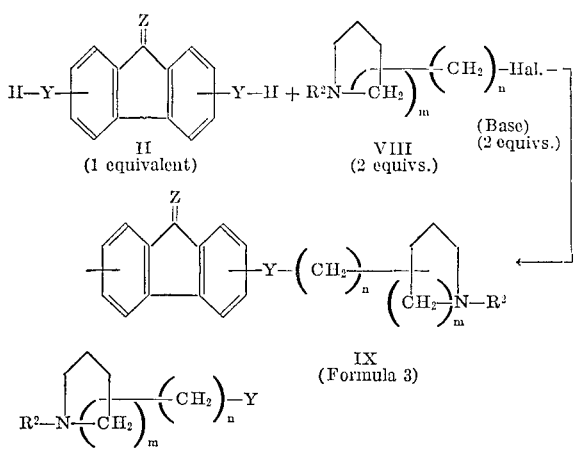

In the above reaction schemes, Y, Z, $RR^1N-$, A, $R^2$, $m$, and $n$ have the same meaning as described previously, and each Hal. is either Cl or Br or I.

Typical examples of the starting materials which find use in the reaction schemes illustrated above are diphenols (II, Y=O), such as: 2,7-dihydroxyfluoren-9-one [C. Courtot, Ann. Chim. (Paris), 14, 5–146 (1930)]; 2,7-dihydroxyfluorene [K. C. Agrawal, J. Med. Chem., 10, 99–101 (1967)]; 3,6-dihydroxyfluoren-9-one [A. Barker and C. C. Barker, J. Chem. Soc. (London), 1954, 870–873]; and both 2,5- and 2,6 - dihydroxyfluoren-9-ones, which may be obtained from the corresponding diaminofluorenones by the tetrazotization procedure of Barker and Barker, loc. cit. Typical dithiols (II, Y=S) which can be used in the above reaction schemes are fluorene-2,7-dithiol [P. C. Dutta and D. Mandel, J. Indian Chem. Soc. 33, 721–723 (1956)] and 2,7 - dimercaptofluoren-9-one, which may be prepared from o-oxofluorene-2,7-disulfonyl chloride by reduction with an excess of sodium dithionite.

Typical haloalkylamines (III) useful in Scheme 1 are, for example, N,N-diethyl-2-chloroethylamine and N-(2-chloroethyl)piperidine. Typical dihaloalkanes (V) useful in Scheme 2 are, for example, 1 - bromo-2-chloroethane and 1,6-dibromohexane. Amines (VII) useful in Scheme 2 are primary amines, such as, for example, ethylamine, or secondary amines, such as, for example, dimethylamine, or tertiary amines, such as, for example, hexamethylenetetramine. Typical of the halogen substituted heterocyclic nitrogen compounds (VIII) useful in Scheme 3 is, for example, 3-chloromethyl-1-methylpiperidine.

In the above reaction schemes, the "base" used can be any base that will form a salt of a phenol, for example, sodium methoxide, sodium hydride, sodium amide, sodium hydroxide, potassium hydroxide, and the like. Solvents used as the reaction medium may vary over a wide range of solvent types and include aromatic hydrocarbons such as benzene, toluene, xylene, etc.; halogenated aromatics such as chlorobenzene and the like; aprotic solvents such as N,N-dimethylformamide, N,N-dimethylacetamide, and dimethylsulfoxide; alcohols such as ethanol, isopropanol and the like; ketones such as acetone, butanone and the like; ethers such as tetrahydrofuran, dioxane and the like; water; or mixtures of solvents.

In the method of synthesis where either sodium methoxide, sodium amide or sodium hydride, for example, is used as the base, the reaction is carried out in an anhydrous medium, such as anhydrous toluene, chlorobenzene and the like. The base (about 2.5 equivalents) is added to a suspension of, for example, a diphenol (II, Y=O) (1 equivalent) in the anhydrous solvent, and the mixture heated to form the diphenoxide. In the case where sodium methoxide is used, the methanol formed may be removed advantageously by azeotropic distillation. The halide (III, V or VIII) (about 2.5 equivalents) is then added and the mixture heated to reflux for a period which may vary from about 4 to 24 hours. The products (IV, VI or IX) are then isolated to customary procedures, IV and IX usually being isolated as bis-acid addition salts.

In the method where an alkali hydroxide, such as potassium hydroxide, for example, is used as the base, two different procedures may be used. In the one procedure, a concentrated aqueous solution (25–50%) of the alkali hydroxide (about 2.5 equivalents) is added to a suspension of, for example, a diphenol (II, Y=O) (1 equivalent) in a suitable aromatic solvent, for example, xylene. This mixture is then heated to boiling, stirring being desirable, and the water removed by azeotropic distillation, a convenient method being to collect the water in a device such as the so-called Dean-Stark distilling receiver. The reaction mixture, now being essentially anhydrous, is treated with the halide (III, V or VIII) (about 2.5 equivalents) as described above. In the other procedure, the reaction is carried out in a heterogeneous medium of water and an aromatic hydrocarbon, such as for example, toluene, xylene and the like. For example, a diphenol (II, Y=O) (1 equivalent) is suspended in the aromatic hydrocarbon. Then, in Schemes 1 and 3, a solution of about 2.5 equivalents of a hydrohalide salt of the amino halide (i.e., a hydrohalide salt of III or VIII) in the minimum volume of water is added, and with efficient stirring, a concentrated aqueous solution (25–50%) of the alkali hydroxide (about 5 equivalents) is added. The mixture is heated to reflux for a period of about 6 to 24 hours, and the product isolated from the hydrocarbon layer. In Scheme 2, when the aqueous/aromatic hydrocarbon medium is used to prepare compounds of type VI, which contain no amine functions, the amount of alkali hydroxide used is only in slight excess of 2.0 equivalents per 1 equivalent of diphenol or dithiol (II).

In Scheme 2, the reaction between the bis($\omega$-haloalkyl) ether (VI) and the amine (VII) may be carried out under a variety of conditions. For example, the compound VI may be heated together with a large excess of the amine (VII), the excess amine serving as the reaction medium and the hydrohalide acceptor. This method is particularly suitable for readily available amines, the excess of which can be easily removed from the reaction mixture by, for example, distillation at reduced pressure or by steam distillation. Or, the bis($\omega$-haloalkyl)ether (VI) (1 equivalent) and the amine (VII) (4 equivalents or more) may be heated together in one of a number of different types of solvents, for example, in aromatic solvents such as benzene, toluene, xylene, chlorobenzene, and the like, or lower molecular weight alcohols such as methanol, ethanol, isopropyl alcohol, and the like, or lower molecular weight ketones such as acetone, methyl ethyl ketone, and the like. The reaction between the halo compound and the amine is usually promoted by the addition of either sodium or potassium iodide, the iodide being used in either catalytic or stoichiometric amounts. In some cases, as when the amine is expensive or in short supply, it may be advantageous to use only two equivalents of the amine (VII) for each equivalent of the bis($\omega$-haloalkyl) ether (VI), an excess of either powdered sodium or potassium carbonate being used as the acceptor for the hydrohalide generated. In the case of volatile amines, this reaction may be best carried out under pressure in a suitable bomb or autoclave.

The above methods, represented by Schemes 1, 2 and 3, are generally preferred, but not limited to the preparation of fluorenone- and fluorene-bis-basic ethers and thioethers (i.e., IV and IX where Z is O or $H_2$). Scheme 1 is the method generally preferred for those compounds in which A is an alkylene chain containing from 2 to 3 carbon atoms in a straight chain, while Scheme 2 is the method generally preferred for those compounds in which A contains more than 3 carbon atoms in a straight chain.

While the methods illustrated in Schemes 1, 2 and 3 may be used to prepare fluorenol- bis-basic ethers and thioethers (I, Z=H, OH), these compounds are prepared preferably by the reduction of the corresponding fluorenone compounds (I, Z=O) as illustrated in Scheme 4.

Scheme 4

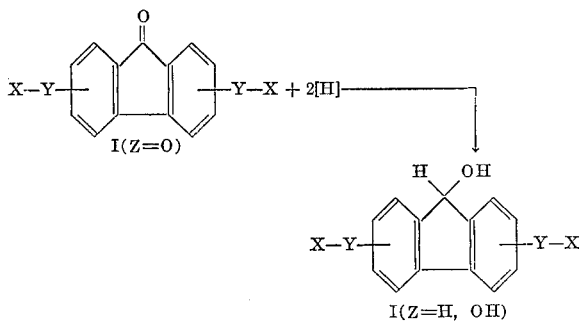

This reduction may be effected by a number of different methods, such as by catalytic reduction with hydrogen, for example, at low pressure in the presence of a noble metal catalyst, such as palladium or platinum or with W-6 Raney nickel catalyst, or with metal hydrides such as sodium or potassium borohydride, or lithium aluminum hydride.

The catalytic reduction is preferably carried out with an acid addition salt, such as the dihydrochloride, of the fluorenone-bis-basic ether or thioether (I, Z=O) in a hydroxylic solvent (water, methanol, ethanol, etc.) at ambient temperature (20–30° C.) with hydrogen at 3 to 5 atmospheres pressure in the presence of a noble metal catalyst, such as palladium on carbon. The orange-red color, e.g., of the fluorenone-bis-basic ether, in the solution disappears when the reduction is complete, usually within one hour. The borohydride reduction is preferably carried out at ambient temperature (20°–30° C.) by adding the fluorenone-bis-basic ether or thioether (I, Z=O) to an excess of the borohydride, for example, sodium borohydride, dissolved in water, aqueous methanol, or aqueous ethanol to which about 0.2% sodium hydroxide has been added. The lithium aluminum hydride reduction is effected by adding dropwise a solution of the fluorenone-bis-basic ether or thioether (I, Z=O) in anhydrous ether to a solution of excess lithium aluminum hydride in anhydrous ether. The reaction is exothermic and is essentially complete at the time the ketone is all added, or within an additional one to two hours of reflux.

Another method for this reduction is the Meerwein-Ponndorf-Verley reaction in which the substituted fluorenone is dissolved in isopropanol, an equivalent of aluminium isopropoxide is added, and the mixture is slowly distilled to remove acetone as it is formed by the reaction Still another method which may be employed is the reduction with alkali metals, such as sodium, acting upon a solution of the fluorenone-bis-basic ether in a protic solvent such as alcohol. Large excesses of the metal are required for complete reduction and the method generally offers few advantages. Other metal reductions, such as zinc and sodium hydroxide, magnesium and methanol, or sodium amalgam, will also satisfactorily effect the reduction but seldom offer advantage.

Under certain conditions, an alkyl magnesium halide (Grignard reagent) has been found to effect this reduction and there has been included an Example (No. 7) in which this reaction was demonstrated to occur. However, this method is not a general reaction, since under slightly different conditions, the normal addition of Grignard reagent to carbonyl takes place.

While fluorene- bis-basic ethers and thioethers (I, Z=$H_2$) are preferably prepared by the methods illustrated in Schemes 1, 2 and 3, they may also be prepared by reduction of the corresponding fluorenone- bis-basic ethers and thioethers (I, Z=O) as illustrated in Scheme 5.

Scheme 5

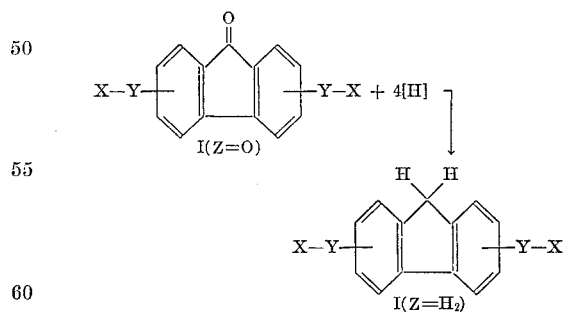

Among the methods which may be used in effecting this reduction of the ketone function to methylene are, for example, catalytic reduction with hydrogen at low pressure (3 to 5 atmospheres) in the presence of a noble metal catalyst, such as palladium or platinum, or with W-6 Raney nickel catalyst. This procedure is similar to the catalytic reduction method described in Scheme 4 above, except that in this case, larger amounts of catalyst are used, and the reduction is carried out at higher temperatures (50° to 60° C. and for a longer period (about 4 to 8 hours).

Fluorenol-bis-basic ethers and thioethers, (I, Z=H, OH) can also be reduced to the corresponding fluorenones (I, Z=$H_2$) by methods similar to those described above for the reduction of the fluorenones (I, Z=O). Fluorenol- or fluorene- bis-basic ethers (I, Z=H, OH or H₂; Y=O) but not thioethers, can also be oxidized to the corresponding fluorenones (I, Z=O, Y=O). Oxidative methods which have been found to be useful to effect these transformations are, for example, reaction with the stoichiometric quantity of dichromate salt. Additionally, fluorene-bis-basic ethers (I, Z=H₂; Y=O) may be successfully oxidized to the corresponding fluorenones (I, Z=O; Y=O) by passing air or oxygen through a solution of the substituted fluorene in pyridine containing a catalytic quantity of a strong base such as benzyltrimethyl-ammonium hydroxide.

Additional methods by which bis-basic ethers and thioethers of type IV may be prepared are illustrated in Schemes 6 and 7.

Scheme 6

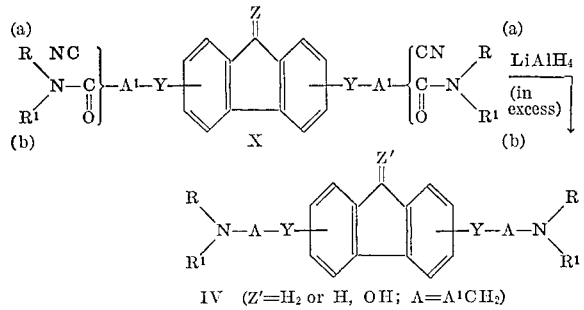

IV (Z'=H₂ or H, OH; A=A¹CH₂)

In this scheme of synthesis, R, R¹, A and Y have the same meaning specified previously, Z' is H₂ or H, OH, and A¹ is an alkylene chain having one less methylene (CH₂) group in a straight chain than does A (i.e., A=A¹ CH₂). The intermediate nitriles (Xa) and amides (Xb) may be prepared by the method illustrated, for example, in Scheme 1 above, in which the appropriate ω-haloalkyl nitriles and amides are substituted for the haloalkyl amines (III).

According to the method of preparation illustrated in Scheme 6, compounds of Type IV, in which both R and R¹ are hydrogen, may be prepared from either the nitriles (Xa) or the unsubstituted amides (Xb: R=R¹=H). By this method, compounds of type X in which Z=O may yield compounds of type IV in which Z=H, OH; that is-, the carbonyl function of the fluorenones may be reduced by lithium aluminum hydride to yield the corresponding fluorenols. As described above, both fluorene- and fluorenol-bis-basic ethers of the type IV (Y=O; Z=H₂ or H, OH) can be oxidized to the corresponding fluorenones (IV: Y=O, Z=O).

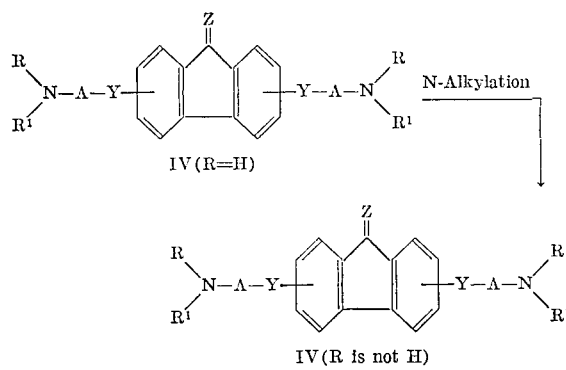

In this scheme of synthesis, R¹, A, Y and Z have the same meaning as specified previously, and with the exceptions noted in the two formulas above, R has the same meaning as specified previously. Alkylation of the primary amines (IV: R=R¹=H) by the method illustrated in Scheme 7 may be used to prepare either the secondary amines (IV: R=H; R¹ is not H) or the symmetrically substituted tertiary amines (IV: R=R¹ but neither is H).

One method for preparing the secondary amines (IV: R=H; R¹ is not H) is the reaction of the primary amines (IV: R=R¹=H) with the stoichiometric quantities of the appropriate aldehydes or ketones to yield the corresponding Schiff's bases, which may then be reduced with either a borohydride or molecular hydrogen in the presence of a catalyst, such as platinum or Raney nickel, for example. Another method for preparing the secondary amines is acylation of the primary amines with the appropriate acyl halides or anhydrides, followed by reduction of the N-acyl amines with lithium aluminum hydride. Reductive alkylation of the primary amines with an excess of the appropriate aldehydes or ketones in the presence of molecular hydrogen and a catalyst, such as platinum or Raney nickel, for example, will yield the symmetrically substituted tertiary amines (IV: R=R¹ but neither is H). In the methods above, in which reductive procedures are used, the fluorenones (IV: Z=O) may be reduced to the fluorenols (IV: Z=H, OH) and possibly, in the cases of catalytic reduction, to the fluorenes (IV: Z=H₂). As previously described, fluorene- and fluorenol- bis-basic ethers, but not thioethers, may be readily oxidized to the corresponding fluorenones.

Alkylation of the primary amines with a large excess of the appropriate halides yields the symmetrically substituted tertiary amines (IV: R=R¹ but neither is H). Alkylation of the primary amines with formaldehyde and formic acid by the Eschweiler-Clarke procedure yields the tertiary amines of type IV in which R=R¹=CH₃.

Alkylation of the secondary amines (IV: R=H; R¹ is not H) by the method illustrated in Scheme 7 may be used to prepare either the symmetrically substituted tertiary amines (IV: R=R¹ but neither is H) or the unsymmetrically substituted tertiary amines (IV: R and R¹ are different and neither is H).

Reaction of the secondary amines (IV: R=H, R¹ is not H) with the appropriate halides is one method for effecting N-alkylation. Another useful method is the so-called reductive alkylation of the secondary amines with the appropriate aldehydes or ketones in the presence of molecular hydrogen and a catalyst, such as platinum or Raney nickel, for example. In this latter case, the fluorenones (IV: Z=O) may be reduced to the corresponding fluorenols (IV: Z=H, OH) or to the corresponding fluorenes (IV: Z=H₂), depending upon the reaction conditions and the extent of the reduction. Another useful alkylation method is the two-step method whereby the secondary amines are acylated with the appropriate acyl halides or anhydrides and the resulting N-acyl amines are reduced with lithium aluminum hydride to the corresponding tertiary amines. In this case, the fluorenones (IV: Z=O) may be reduced to the corresponding fluorenols (IV: Z=H, OH). In the cases in which fluorenone- bis-basic ethers are reduced to either the fluorenol- or fluorene-bis-basic ethers, these reduced forms may be oxidized to the fluorenones by methods previously described. Alkylation of the secondary amines with formaldehyde and formic acid by the Eschweiler-Clarke procedure is a method for preparing the tertiary amines of type IV in which R=CH₃.

The pharmaceutically acceptable acid addition salts of the base compounds of this invention can be those of suitable inorganic or organic acids. Mono- or di-acid salts can be formed; also, the salts can be hydrated, e.g., monohydrate, or substantially anhydrous. Suitable inorganic acids for preparing the salt form are, for example, mineral acids, such as hydrohalic acids, e.g., hydrochloric or hydrobromic acid, or sulfuric or phosphoric acids. Suitable organic acids are, for example, citric acid, maleic acid, glycolic acid, lactic acid, tartaric acid, pyruvic acid, malonic acid, succinic acid, methylsuccinic acid, dimethylsuccinic acid, glutaric acid, α-methylglutaric acid, β-methylglutaric acid, itaconic acid, citraconic acid, homocitraconic acid, fumaric acid, malic acid, aconitic acid, tricarballylic acid, methanesulfonic acid, ethanesulfonic acid, 2-hydroxyethanesulfonic acid, ethoxymaleic acid, and the like.

The following examples are illustrative of the invention.

EXAMPLE 1

Preparation of 2,7-bis[2-(diethylamino)ethoxy]fluoren-9-one dihydrochloride

A solution of 2-diethylaminoethyl chloride [obtained from 15.5 g. (0.09 mole) of 2-diethylaminoethyl chloride hydrochloride] in 100 ml. of toluene (dried over molecular sieves) was added to a mixture of 6.4 g. (0.03 mole) of 2,7-dihydroxy-fluoren-9-one and 3.3 g. (0.06 mole) of sodium methoxide in 200 ml. of toluene (dried over molecular sieves). This mixture was heated to reflux with stirring for three hours. Upon cooling, the mixture was filtered to remove the precipitated sodium chloride. The toluene solution was washed three times with water, then once with a saturated sodium chloride solution and dried over anhydrous magnesium sulfate. This mixture was filtered and the filtrate acidified to Congo Red with ethereal hydrogen chloride. The solid which precipitated was filtered, recrystallized from butanone with enough methanol added to effect solution, and the product dried at 100° C. for twenty-four hours under vacuum. M.P. 235–237° C.

$\lambda_{max.}^{water}$ 269 m$\mu$, $E_{1\,cm.}^{1\%}$ 1600

In a similar manner the following compounds were prepared:

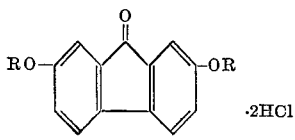
RO—⟨⟩—OR
·2HCl

| Compound No. | R | M.P. (° C.) | $\lambda_{max.}$ (m$\mu$)¹ | $E_{1cm.}^{1\%1}$ |
|---|---|---|---|---|
| 2² | CH₂CH₂N(n-C₄H₉)₂ | 165–167 | 270 | 1,330 |
| 3² | CH₂CH₂CH₂N(CH₃)₂ | 282–283 | 270 | 1,640 |
| 4³ | CH₂CH₂CH₂N(C₂H₅)₂ | 256–257 | 270 | 1,460 |
| 5² | CH₂CH₂CH₂N(n-C₄H₉)₂ | 176–179 | 270 | 1,210 |

¹ In water.
² Initial reaction period was eighteen hours.
³ Initial reaction period was six hours.

EXAMPLE 2

Preparation of 2,7-bis[2-(diethylamino)ethoxy]fluoren-9-one dihydrochloride

A mixture of 63.6 g. (0.30 mole) of 2,7-dihydroxy-fluoren-9-one, 163.0 g. (0.95 mole) of 2-diethylaminoethyl chloride hydrochloride and 132 g. (2.0 moles) of 85% potassium hydroxide in 900 ml. of toluene and 300 ml. of water was refluxed with vigorous stirring for twenty hours. Upon cooling, the layers were separated. The toluene layer was washed three times with water, then once with a saturated sodium chloride solution and dried over anhydrous magnesium sulfate. The mixture was filtered and the solvent removed in vacuo. The residue was taken up in isopropyl alcohol and acidified to Congo Red with ethereal hydrogen chloride. The solid which precipitated was filtered, recrystallized from a mixture of three parts isopropyl alcohol to one part methanol, and the product dried at 100° C. for twenty-four hours under vacuum. M.P. 232–233° C., $\lambda_{max.}^{water}$ 269 m$\mu$, $E_{1\,cm.}^{1\%}$ 1620

In a similar manner the following compounds were prepared:

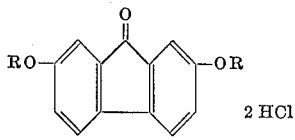
RO—⟨⟩—OR
2 HCl

| Compound No. | R | M.P. (° C.) | $\lambda_{max.}$ (m$\mu$)¹ | $E_{1\,cm.}^{1\%1}$ |
|---|---|---|---|---|
| 6² | CH₂CH₂N(CH₃)C₂H₅ | 245–247 | 270 | 1,760 |
| 7² | CH₂CH₂N(CH₃)(n-C₄H₉) | 240–243 | 270 | 1,570 |
| 8² | CH₂CH₂N[CH(CH₃)₂]₂ | 238–239 | 270 | 1,470 |
| 9² | CH₂CH₂N⟨pentyl⟩ | ³275–278 | 270 | 1,640 |
| 10² | CH₂CH₂N⟨hexyl⟩ | 304–306 | 269 | 1,540 |
| 11² | CH₂CH₂N⟨morpholino⟩ | 291–293 | 269 | 1,490 |
| 12² | CH₂CH₂CH₂N⟨hexyl⟩ | 279.5–280.5 | 270 | 1,370 |
| 13² | CH₂CH(CH₃)CH₂N(CH₃)₂ | 263–265 | 270 | 1,560 |

¹ In water.
² Sodium hydroxide was used in place of potassium hydroxide.
³ (Dec.)

EXAMPLE 3

Preparation of 2,7-bis[2-(dimethylamino)ethoxy]fluoren-9-one dihydrochloride (A) To a stirred, refluxing mixture of 21.2 g. (0.10 mole) of 2,7-dihydroxyfluoren-9-one and 43.0 g. (0.30 mole) of 1-bromo-2-chloroethane in 400 ml. of water was added dropwise, over a period of 30 minutes, 80 ml. (0.20 mole) of 10% aqueous sodium hydroxide. After complete addition of the alkali, the mixture was refluxed with stirring for eighteen hours. Upon cooling, the supernatant water layer was decanted and the residue taken up in ethanol. The solid that separated was filtered, washed with ethanol, and dried in the air, M.P. 161–174°. The material was dissolved in chloroform, washed with 10% aqueous sodium hydroxide, with water and dried over anhydrous magnesium sulfate. The mixture was filtered, the solvent evaporated, the residue recrystallized from a mixture of five parts ethanol to one part chloroform and the product dried in the air. The intermediate 2,7-bis(2-chloroethoxy)fluoren-9-one melted at 135–139° C.

(B) A mixture of 4.4 g. (0.013 mole) of 2,7-bis(2-chloroethoxy)fluoren-9-one, 2 g. of potassium iodide and 100 ml. of 40% aqueous dimethylamine in 50 ml. of tetrahydrofuran was heated with stirring at 122° C. for sixteen hours in a Parr Pressure Reactor. The solvent was removed in vacuo and the residue taken up in water. The aqueous solution was made basic with 10% sodium hydroxide and extracted with ether. The ether solution was washed twice with water, then with saturated sodium chloride solution and dried over anhydrous magnesium sulfate. The mixture was filtered and the filtrate acidified to Congo Red with ethereal hydrogen chloride. The ether was decanted from the oil which precipitated and the oil recrystallized, once from butanone with enough methanol added to effect solution, and twice from methanol alone. The product obtained was dried at 100° C. under vacuum. M.P. 278–280° C. (dec.).

$\lambda_{max.}^{water}$ 268 m$\mu$, $E_{1\,cm.}^{1\%}$ 1800

EXAMPLE 4

Preparation of 2,7-bis[2-(dimethylamino)ethoxy]fluoren-9-one dihydrochloride

A mixture of 21.2 g. (0.10 mole) of 2,7-dihydroxy-fluoren-9-one, 16.0 g. (0.296 mole) of sodium methoxide, 250 ml. of chlorobenzene and 60 ml. of methanol was stirred and heated in such a way that the methanol was allowed to distill off, until the reaction mixture reached a temperature of 130° C. The mixture was then cooled to below 100° and 32.6 g. (0.30 mole) of 2-dimethylaminoethyl chloride in 71.4 g. of chlorobenzene added. The mixture was stirred and refluxed at 130° for eighteen hours and then cooled to about room temperature. To the mixture were added 300 ml. of water and 40 ml. of 10% aqueous sodium hydroxide and this mixture stirred for 30 minutes. The top aqueous layer was separated and extracted with chloroform. The organic fractions were combined, washed with water, then with saturated sodium chloride solution and dried over anhydrous magnesium sulfate. The mixture was filtered and the solvent removed in vacuo. The residue was taken up in 300 ml. of methanol and acidified to Congo Red with alcoholic hydrogen chloride. The solid which precipitated was filtered, recrystallized from methanol and the product dried at 100° C. for twenty-four hours under vacuum. M.P. 282–284° C., $\lambda_{max.}^{water}$ 269, $E_{1\ cm.}^{1\%}$ 1770

EXAMPLE 5

Preparation of 2,7-bis[2-(diethylamino)ethoxy]fluorene dihydrochloride

A solution of 2-diethylaminoethyl chloride [obtained from 12.9 g. (0.075 mole) of 2-diethylaminoethyl chloride hydrochloride] in 100 ml. of toluene (dried over molecular sieves) was added to a mixture of 4.9 g. (0.025 mole) of 2,7-dihydroxyfluorene and 2.7 g. (0.05 mole) of sodium methoxide in 200 ml. of toluene (dried over molecular sieves). This mixture was refluxed with stirring for three hours. Upon cooling, the mixture was filtered to remove the precipitated sodium chloride. The toluene solution was washed three times with water, then once with a saturated sodium chloride solution and dried over anhydrous magnesium sulfate. This mixture was filtered and the filtrate acidified to Congo Red with ethereal hydrogen chloride. The solid which precipitated was filtered, dissolved in butanone with enough methanol added to effect solution, decolorized with charcoal, and the product obtained dried at 80° C. under vacuum. M.P. 213–216° C., $\lambda_{max.}^{water}$ 274 m$\mu$, $E_{1\ cm.}^{1\%}$ 588

In a similar manner, the following compounds were prepared:

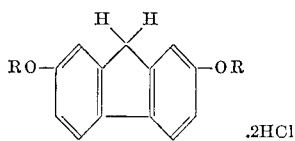

| Compound No. | R | M.P. (° C.) | $\gamma_{max.}$ (m$\mu$)[1] | $E_{1\ cm}^{1\%.}$ |
|---|---|---|---|---|
| 16 [2] | CH$_2$CH$_2$CH$_2$N(C$_2$H$_5$)$_2$ | 217–220 | 275 | 535 |
| 17 [2] | CH$_2$CH$_2$CH$_2$N(n-C$_4$H$_9$)$_2$ | 170–172 | 275 | 444 |

[1] In water.
[2] Initial reaction period was eighteen hours.

EXAMPLE 6

Preparation of 2,7-bis[2-(diethylamino)ethoxy]fluoren-9-ol dihydrochloride

Example of reduction of 2,7-bis[2-(diethylamino)ethoxy]fluoren-9-one (Example 1) with sodium borohydride. A total of 2.3 g. (0.06 mole) of sodium borohydride was added in small portions to a stirred solution of 9.7 g. (0.02 mole) of 2,7-bis[2-(diethylamino)ethoxy]fluoren-9-one dihydrochloride in 200 ml. of methanol, maintaining the mixture at 0° throughout the addition. The mixture was allowed to warm to room temperature and the solvent removed in vacuo. The residue was taken up in 10% hydrochloric acid, the mixture extracted with ether, and the aqueous acidic solution evaporated in vacuo. The residue was dissolved in methanol, cooled at −20° C., and the inorganic material which precipitated removed by filtration. The filtrate was evaporated in vacuo, the residue dissolved in water and made basic with 10% aqueous sodium hydroxide. The liberated free base was extracted into ether, the ether extract washed with water and dried over anhydrous magnesium sulfate. The mixture was filtered, the filtrate evaporated, the residue taken up in isopropyl alcohol and acidified to Congo Red with ethereal hydrogen chloride. The precipitated product was collected and recrystallized three times from a mixture of isopropyl alcohol and methanol. M.P. 192–194° C., $\lambda_{max.}^{water}$ 284 m$\mu$, $E_{1\ cm.}^{1\%}$ 524

EXAMPLE 7

Preparation of 2,7-bis[2(diethylamino)ethoxy]fluoren-9-ol dihydrochloride

Example of reduction of 2,7-bis[2-(diethylamino)ethoxy]fluoren-9-one (Example 1) with the butyl Grignard reagent. To a solution of n-butylmagnesium bromide, prepared in the usual manner from 19.4 g. (0.14 mole) of n-butyl bromide, 3.4 g. (0.14 g.-atom) of magnesium turnings and 650 ml. of anhydrous ether, was added dropwise a solution of 16.4 g. (0.04 mole) of 2,7-bis-[2-(diethylamino)ethoxy]fluoren-9-one in 600 ml. of dry ether, the mixture being maintained at gentle reflux throughout the addition. The reaction mixture was slowly poured over a mixture of ice, water and 50 g. of ammonium chloride. The ether layer was separated, washed twice with water and dried over anhydrous magnesium sulfate. The ether was evaporated, the residue taken up in isopropyl alcohol and acidified to Congo Red with ethereal hydrogen chloride. The precipitated product was collected and recrystallized twice from a mixture of isopropyl alcohol and methanol. M.P. 196–197° C., $\lambda_{max.}^{water}$ 284 m$\mu$, $E_{1\ cm.}^{1\%}$ 520

EXAMPLE 8

Preparation of 2,7-bis[2 - (diethylamino)ethoxy]fluoren-9-ol dihydrochloride

Example of catalytic reduction of 2,7-bis[2-(diethylamino)ethoxy]fluoren-9-one (Example 1). In a Parr low pressure hydrogenation apparatus, a mixture of 9.7 g. (0.02 mole) of 2,7-bis[2-(diethylamino)ethoxy]fluoren-9-one dihydrochloride, 2 g. of 10% palladium on carbon, and 200 ml. of methanol was shaken with hydrogen at an initial pressure of about 50 p.s.i. The calculated amount of hydrogen was taken up within 30 minutes. The catalyst was removed by filtration, the filtrate evaporated to dryness, and the residue recrystallized as in Example 7 from a mixture of isopropyl alcohol and methanol. M.P. 195–197° C., $\lambda_{max.}^{water}$ 284 m$\mu$, $E_{1\ cm.}^{1\%}$ 550

EXAMPLE 9

By the method of Example 1, but substituting for 2-diethylaminoethyl chloride, the appropriate molar equivalent quantities of 2-dihexylaminoethyl chloride, 2-diallylaminoethyl chloride, or 3 - chloromethyl-1-methyl-piperidine, the following compounds can be prepared:

2,7-bis[2-(di-n-hexylamino)ethoxy]fluoren-9-one dihydrochloride 2,7-bis[2-(diallylamino)ethoxy]fluoren-9-one dihydrochloride 2,7-bis[(1-methyl-3-piperidyl)methoxy]fluoren-9-one dihydrochloride Also, by essentially the method of Example 1, but substituting the appropriate molar equivalent amount of sodium amide for sodium methoxide and heating the mixture of sodium amide and 2,7-dihydroxyfluoren-9-one in dry toluene until the evolution of ammonia ceases, then adding the appropriate molar equivalent amount of 1-methyl-3-chloropiperidine instead of 2-diethylaminoethyl chloride, the following compound can be prepared:

2,7-bis[(1-methyl-3-piperidyl)oxy]fluoren-9-one dihydrochloride

EXAMPLE 10

By essentially the method of Example 3–B, but substituting for the dimethylamine, an excess of at least 4 molar equivalent quantities of ethylamine, butylamine or cyclopropylamine, the following compounds can be prepared:

2,7-bis[2-(ethylamino)ethoxy]fluoren-9-one dihydrochloride
2,7-bis[2-(butylamino)ethoxy]fluoren-9-one dihydrochloride
2,7-bis[2-(cyclopropylamino)ethoxy]fluoren-9-one dihydrochloride When primary amines are used in substantial excess in this method, it is occasionally noted that the reaction mixture will contain some ketimine formed from the 9-carbonyl and the excess amine. This ketimine is readily hydrolyzed if the reaction mixture, after removal of solvent and excess amine in vacuo, is warmed for a short period with dilute acid on the steam bath. After this treatment, the solution is basified and worked up as described in Example 3–B.

Similarly, 2,7 - bis(6 - chlorohexyloxy)fluoren-9-one, M.P. 70.5–72.0° C., may be prepared by the method of Example 3–A and reacted with diethylamine by the method of Example 3–B to yield:

2,7-bis[6-(diethylamino)hexyloxy]fluoren-9-one dihydrochloride.

By a method similar to that of Example 3–B, the primary amine, 2,7-bis(2-aminoethoxy)fluoren-9-one dihydrochloride, can be prepared. Slightly more than 2 mole equivalents of hexamine, $(CH_2)_6N_4$, are reacted with 2,7-bis(2-chloroethoxy)fluoren-9-one. In this reaction an absolute ethanol/acetone mixture is used as the solvent, 2 mole equivalents of potassium iodide are added and the reaction is carried out at reflux for 18 hours. After the solvents have been removed by distillation, the intermediate quaternary ammonium complex is decomposed by refluxing with an excess of dilute hydrochloric acid. The subsequent work-up is effected by the technique described in Example 3–B.

EXAMPLE 11

By the method of Example 2, but substituting for 2,7-dihydroxyfluoren-9-one, the appropriate molar equivalent quantities of 2,5-dihydroxyfluoren-9-one, 2,6-dihydroxyfluoren-9-one, 3,6-dihydroxyfluoren-9-one, 2,7-dimercaptofluoren - 9 - one, or fluorene-2,7-dithiol, the following compounds can be prepared:

2,5-bis[2-(diethylamino)ethoxy]fluoren-9-one dihydrochloride
2,6-bis[2-(diethylamino)ethoxy]fluoren-9-one dihydrochloride
3,6-bis[2-(diethylamino)ethoxy]fluoren-9-one dihydrochloride
2,7-bis[2-(diethylamino)ethylthio]fluoren-9-one dihydrochloride
2,7-bis[2-(diethylamino)ethylthio]fluorene dihydrochloride

EXAMPLE 12

The compound 2,7 - bis[2-(diethylamino)ethoxy]fluorene dihydrochloride, disclosed in Example 5, can also be prepared by catalytic reduction of 2,7-bis[2-(diethylamino)ethoxy]fluoren-9-one dihydrochloride (Example 1). The procedure for this reduction is very similar to that described in Example 8, with the exceptions that about 4 g. of 10% palladium on carbon was used for each 0.02 mole of the fluorenone, the reaction temperature was 50° C. and the reaction period required for complete reduction to the fluorene was 3–6 hours. The initial hydrogen pressure was 40–50 p.s.i. Water was substituted for methanol as the reaction solvent. The product may be isolated as in Example 8 and recrystallized, as in Example 5, from butanone and methanol. M.P. 224–225° C.

EXAMPLE 13

This example illustrates antiviral activity of 2,7-bis[3-(diethylamino)propoxy]fluoren-9-one dihydrochloride.

Two groups of mice were inoculated with a fatal dose (10 $LD_{50}$) of encephalomyocarditis. Each mouse weighed about 15 grams and each of the two groups of mice contained from 10 to 20 animals. The mice in one of the groups were treated both prophylactically and therapeutically by subcutaneous injections of 2,7-bis[3-(diethylamino)propoxy]fluoren-9-one dihydrochloride. The injections were given 28, 22 and 4 hours prior to inoculation with the virus and 2, 20 and 26 hours after inoculation. The volume of each injection was 0.25 ml. and contained the active ingredient at a dosage level of 50 mg. per kg. dissolved in sterile water which also contained 0.15% of hydroxyethylcellulose. The control animals received a sham dosage of the same volume of the vehicle which did not contain the active ingredient. Observations over a 10-day period showed that the treated group of mice survived for a longer time than the controls.

EXAMPLE 14

An illustrative composition for a parenteral injection is the following wherein the quantities are on a weight to volume basis.

(a) 2,7-bis(3-piperidinopropoxy)fluoren - 9 - one dihydrochloride: 200 mg.
(b) Sodium chloride: q.s.
(c) Water for injection to make 10 ml.

The composition is prepared by dissolving the active ingredient and sufficient sodium chloride in water for injection to render the solution isotonic. The composition may be dispensed in a single ampule containing 200 mg. of the active ingredient for multiple dosage or in 10 ampules for single dosage.

EXAMPLE 15

An illustrative composition for hard gelatin capsules is as follows:

(a) 2,7-bis[2-(diethylamino)ethoxy]fluoren-9-one dihydrochloride: 200 mg. (per capsule).
(b) Talc: 35 mg. (per capsule).

The formulation is prepared by passing the dry powders of (a) and (b) through a fine mesh screen and mixing them well. The powder is then filled into No. 0 hard gelatin capsules at a net fill of 235 mg. per capsule.

EXAMPLE 16

Preparation of 2,7-bis[2-di-n-propylamino)ethoxy] fluoren-9-one dihydrochloride

By the method described in Example 4, a mixture of 5.3 g. (0.025 mole) of 2,7-dihydroxyfluoren-9-one, 2.7 g. (0.050 mole) of sodium methoxide, 25 ml. of methanol, and 200 ml. of chlorobenzene was stirred and heated to distill the methanol out of the mixture. When the boiling point of the distillate reached 130°, the mixture was cooled to below 100° C. and a solution of di-n-propylaminoethyl chloride [obtained from 21.0 g. (0.105 mole) of di-n-propylaminoethyl chloride hydrochloride] in 100 ml. of chlorobenzene was added. The resulting mixture was heated to reflux, with stirring, for six hours. The mixture was worked up as described in Example 4. The residual base was dissolved in butanone, rather than methanol, and the dihydrochloride precipitated by the addition of alcoholic hydrogen chloride. The rose-colored solid was filtered, then recrystallized from butanone with enough methanol added to effect solution. The recrystallized product was filtered and dried at 100° C., under vacuum. M.P. 194–197° C.;

$\lambda_{max.}^{water}$ 270 m$\mu$, $E_{1\,cm.}^{1\%}$ 1485

EXAMPLE 17

By the catalytic reduction method of Example 8, but substituting the appropriate molar quantities of 2,7-bis[2-(dimethylamino)ethoxy]fluoren - 9 - one dihydrochloride and 2,7-bis[2-(ethylmethylamino)ethoxy]fluoren - 9 - one dihydrochloride for 2,7-bis[2-(diethylamino)ethoxy]fluoren-9-one dihydrochloride, the following two fluorenol-bis-basic ethers were prepared:

2,7-bis[2-(dimethylamino)ethoxy]fluoren - 9 - ol dihydrochloride, M.P. 264–265° C.; and
2,7-bis[2-(ethylmethylamino)ethoxy]fluoren-9-ol dihydrochloride. M.P. 201–104° C.

EXAMPLE 18

Preparation of 2,7-bis(2-aminoethoxy)fluorene dihydrochloride (A) 2,7-bis(cyanomethoxy)fluorene.—This compound can be prepared essentially by the method described in Example 5, but with the appropriate molar quantity of chloroacetonitrile being substituted for 2-diethylaminoethyl chloride. This compound, being non-basic, can be isolated directly from the toluene solution and purified by recrystallization.

(B) 2,7-bis(2-aminoethoxy)fluorene.—This compound can be prepared by careful addition of the above 2,7-bis(cyanomethoxy)fluorene (0.05 mole), in small portions, to a solution of a large excess of lithium aluminum hydride (0.25 mole) in either anhydrous ether or anhydrous tetrahydrofuran, after which the mixture is heated to reflux for several hours. After careful decomposition of the excess hydride, the 2,7-bis(2-aminoethoxy)fluorene can be isolated from the organic fraction and purified as the dihydrochloride salt.

EXAMPLE 19

Preparation of 2,7-bis[2-(dimethylamino)ethoxy]fluorene dihydrochloride

This compound can be prepared by carefully heating a mixture of 2,7-bis(2-aminoethoxy)fluorene dihydrochloride (0.025 mole), sodium formate (0.05 mole), 90% formic acid (25 g.) and a 37% solution of formaldehyde (25 ml.) until the vigorous evolution of gases ceases, after which the mixture is heated to reflux for about 12 hours. After evaporation of the mixture to dryness and treatment of the residue with dilute sodium hydroxide solution, the product can be extracted into ether, then isolated from the dry ether extract and purified as the dihydrochloride salt.

EXAMPLE 20

Preparation of 2,7-bis[2-(dimethylamino)ethoxy]fluoren-9-one dihydrochloride

In addition to the methods described in Examples 3 and 4, this compound can also be prepared by oxidation of the above 2,7-bis[2-(dimethylamino)ethoxy]fluorene base (obtained from the dihydrochloride salt) with molecular oxygen at ambient temperature in the presence of benzyltrimethylammonium hydroxide. For example, if oxygen is bubbled at a rate of about 500 ml. per minute through a solution of 2,7 - bis[2 - (dimethylamino)ethoxy]fluorene (0.02 mole) in about 75 ml. of anhydrous pyridine, to which has been added 2.5 ml. of a 40% solution of benzyltrimethylammonium hydroxide (free of methanol) in anhydrous pyridine, the oxidation to the fluorenone should be complete in about three hours. The pyridine can be removed in a rotary evaporator and the product extracted into ether. After washing the ether solution thoroughly with water and drying the extract, the fluorenone-bis-basic ether can be isolated and purified as the dihydrochloride salt as described in Examples 3 and 4.

EXAMPLE 21

Preparation of 2,7-bis[2-(diethylamino)ethoxy]fluoren-9-one dihydrochloride

In addition to the methods described in Examples 1 and 2, this compound can also be prepared by oxidation of three molar equivalents of 2,7-bis[2-(diethylamino)ethoxy]fluoren-9-ol dihydrochloride (Examples 6, 7 and 8) with two molar equivalents of sodium dichromate in boiling acetic acid. The oxidation should be complete in about one hour, after which most of the acetic acid can be removed in a rotary evaporator. After treatment of the residue with 28% ammonium hydroxide, the fluorenone-bis-basic ether can be extracted into ether, then isolated and purified as the dihydrochloride salt as described in Examples 1 and 2.

EXAMPLE 22

Preparation of 2,7-bis[2-(diethylamino)ethylthio] fluorene dihydrochloride

This compound can be prepared by the method described in Example 5, but with the appropriate molar quantity of fluorene-2,7-dithiol being substituted for 2,7-dihydroxyfluorene.

What is claimed is:
1. A compound selected from a base of the formula

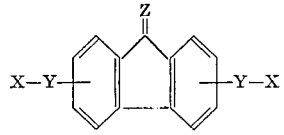

wherein: Z is O, $H_2$ or H, OH; each Y is oxygen or sulfur; and each X is identical and is selected from
(A) the group

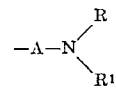

wherein A is alkylene of 2 to about 8 carbon atoms and separates the amino nitrogen thereof and Y by an alkylene chain of at least 2 carbon atoms, each R and $R^1$ is hydrogen, (lower)alkyl, cycloalkyl of 3 to 6 ring carbon atoms, alkenyl of 3 to 6 carbon atoms having the vinyl unsaturation in other than the 1-position of the alkenyl group, or each set of R and $R^1$ taken together with the nitrogen to which they are attached is pyrrolidino, piperidino, N-(lower)alkylpiperazino, or morpholino; or
(B) the group

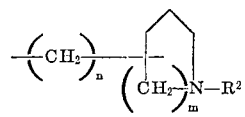

wherein $n$ is integer of 0 to 2, $m$ is 1 or 2 and $R^2$ is hydrogen, (lower)alkyl, or alkenyl of 3 to 6 carbon atoms having the vinyl unsaturation in other than the 1-position of the alkenyl group; or a pharmaceutically acceptable acid addition salt of said base.

2. A compound selected from a base of the formula

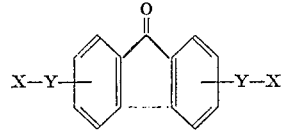

wherein: each Y is oxygen or sulfur; and each X is identical and is selected from
(A) the group

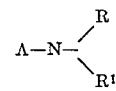

wherein A is alkylene of 2 to about 8 carbon atoms and separates the amino nitrogen thereof and Y by an alkylene chain of at least 2 carbon atoms, each R and $R^1$ is hydrogen, (lower)alkyl, cycloalkyl of 3 to 6 ring carbon atoms, alkenyl of 3 to 6 carbon atoms having the vinyl unsaturation in other than the 1-position of the alkenyl group, or each set of R and $R^1$ taken together with the nitrogen to which they are attached is pyrrolidino, piperidino, N-(lower)alkylpiperazino, or morpholino: or (B) the group,

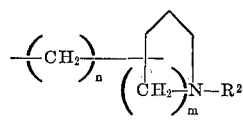

wherein $n$ is an integer of 0 to 2, $m$ is 1 or 2 and $R^2$ is hydrogen, (lower)alkyl, or alkenyl of 3 to 6 carbon atoms having the vinyl unsaturation in other than the 1-position of the alkenyl group; or a pharmaceutically acceptable acid addition salt of said base.

3. A compound of claim 2 wherein: each Y is oxygen; each X is the group

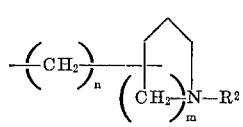

and one of said —Y—X groups is in the 2- or 3-position of the tricyclic ring system and the remaining —Y—X group is in the 5-, 6- or 7-position of the tricyclic ring system.

4. A compound of claim 3 wherein $R^2$ is (lower)alkyl.

5. A compound of claim 2 wherein: Y is oxygen and each X is the group

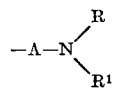

6. A compound of claim 5 wherein: A is alkylene of 2 to 6 carbon atoms; and each R and $R^1$ is (lower)alkyl of 1 to 6 carbon atoms, cycloalkyl of 3 to 6 ring carbon atoms, alkenyl of 3 to 6 carbon atoms having the vinyl unsaturation in other than the 1-position of the alkenyl group, or each set of R and $R^1$ taken together with the nitrogen to which they are attached is pyrrolidino, piperidino, N-(lower)alkylpiperazino having 1 to 2 carbon atoms in said alkyl group, or morpholino; and wherein one of the

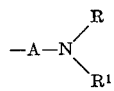

groups is in the 2- or 3-position of the tricyclic ring system and the remaining group is in the 5-, 6- or 7-position of the tricyclic ring system.

7. A compound of claim 6 wherein each R and $R^1$ is (lower)alkyl.

8. A compound selected from a base of the formula

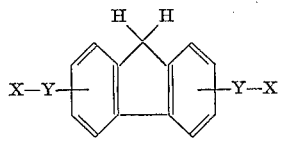

wherein: each Y is oxygen or sulfur; and each X is identical and is selected from
(A) the group

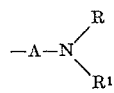

wherein A is alkylene of 2 to about 8 carbon atoms and separates the amino nitrogen thereof and Y by an alkylene chain of at least 2 carbon atoms, each R and $R^1$ is hydrogen, (lower)alkyl, cycloalkyl of 3 to 6 ring carbon atoms, alkenyl of 3 to 6 carbon atoms having the vinyl unsaturation in other than the 1-position of the alkenyl group, or each set of R and $R^1$ taken together with the nitrogen to which they are attached is pyrrolidino, piperidino, N-(lower)alkylpiperazino, or morpholino; or (B) the group

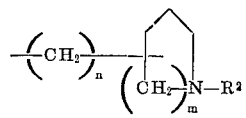

wherein $n$ is an integer of 0 to 2, $m$ is 1 or 2 and $R^2$ is hydrogen, (lower)alkyl, or alkenyl of 3 to 6 carbon atoms having the vinyl unsaturation in other than the 1-position of the alkenyl group; or a pharmaceutically acceptable acid addition salt of said base.

9. A compound of claim 8 wherein: each Y is oxygen; each X is the group

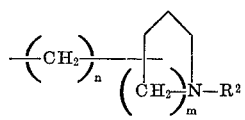

and one of said —Y—X groups is in the 2- or 3-position of the tricyclic ring system and the remaining —Y—X group is in the 5-, 6- or 7-position of the tricyclic ring system.

10. A compound of claim 9 wherein $R^2$ is (lower)alkyl.

11. A compound of claim 8 wherein: Y is oxygen and each X is the group

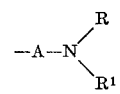

12. A compound of claim 11 wherein: A is alkylene of 2 to 6 carbon atoms; and each of R and $R^1$ is (lower)alkyl, cycloalkyl of 3 to 6 ring carbon atoms, alkenyl of 3 to 6 carbon atoms having the vinyl unsaturation in other than the 1-position of the alkenyl group, or each set of R and $R^1$ taken together with the nitrogen to which they are attached is pyrrolidino, piperidino, N-(lower)alkylpiperazino having 1 or 2 carbon atoms in said alkyl group, or morpholino; and wherein one of the

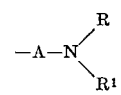

groups is in the 2- or 3-position of the tricyclic ring system and the remaining group is in the 5-, 6- or 7-position of the tricyclic ring system.

13. A compound of claim 12 wherein each of R and $R^1$ is (lower)alkyl.

14. A compound selected from a base of the formula

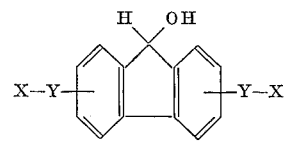

wherein each Y is oxygen or sulfur; and each X is identical and is selected from
(A) the group

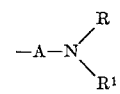

wherein each A is alkylene of 2 to about 8 carbon atoms and separates the amino nitrogen thereof and Y by an alkylene chain of at least 2 carbon atoms, each R and $R^1$ is hydrogen, (lower)alkyl, cycloalkyl of 3 to 6 ring carbon atoms, alkenyl of 3 to 6 carbon atoms having the vinyl unsaturation in other than the 1-position of the alkenyl group, or each set of R and $R^1$ taken together with the nitrogen to which they are attached is pyrrolidino, piperidino, N-(lower)alkylpiperazino or morpholino; or (B) the group

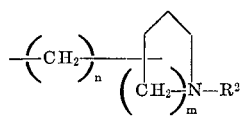

wherein n is an integer of 0 to 2, m is 1 or 2 and R² is hydrogen, (lower)alkyl, or alkenyl of 3 to 6 carbon atoms having the vinyl unsaturation in other than the 1-position of the alkenyl group; or a pharmaceutically acceptable acid addition salt of said base.

15. A compound of claim 14 wherein: each Y is oxygen; each X is the group

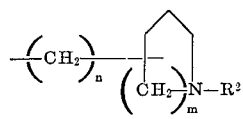

and one of said —Y—X groups is in the 2- or 3-position of the tricyclic ring system and the remaining —Y—X group is in the 5-, 6- or 7-position of the tricyclic ring system.

16. A compound of claim 14 wherein: Y is oxygen and each X is the group

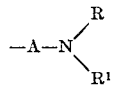

17. A compound of claim 16 wherein: A is alkylene of 2 to 6 carbon atoms; and each of R and R¹ is (lower) alkyl, cycloalkyl of 3 to 6 ring carbon atoms, alkenyl of 3 to 6 carbon atoms having the vinyl unsaturation in other than the 1-position of the alkenyl group, or each set of R and R¹ taken together with the nitrogen to which they are attached is pyrrolidino, piperidino, N-(lower) alkylpiperazino having 1 or 2 carbon atoms in said alkyl group, or morpholino; and wherein one of the

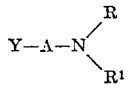

groups is in the 2- or 3-position of the tricyclic ring system and the remaining group is in the 5-, 6- or 7-position of the tricyclic ring system.

18. A compound of claim 17 wherein each of R and R¹ is (lower)alkyl.

19. A base compound of claim 6 which is 2,7-bis[2-(dimethylamino)ethoxy]fluoren-9-one or a pharmaceutically acceptable acid addition salt thereof.

20. A base compound of claim 6 which is 2,7-bis[2-(diethylamino)ethoxy]fluoren-9-one or a pharmaceutically acceptable acid addition salt thereof.

21. A base compound of claim 6 which is 2,7-bis[2-(ethylmethylamino)ethoxy]fluoren-9-one or a pharmaceutically acceptable acid addition salt thereof.

22. A base compound of claim 6 which is 2,7-bis(2-pyrrolidinoethoxy)fluoren-9-one or a pharmaceutically acceptable acid addition salt thereof.

23. A base compound of claim 6 which is 2,7-bis[3-(diethylamino)propoxy]fluoren-9-one or a pharmaceutically acceptable acid addition salt thereof.

24. A base compound of claim 6 which is 2,7-bis[3-(dibutylamino)propoxy]fluoren-9-one or a pharmaceutically acceptable acid addition salt thereof.

25. A base compound of claim 6 which is 2,7-bis(2-piperidinoethoxy)fluoren-9-one or a pharmaceutically acceptable acid addition salt thereof.

26. A base compound of claim 6 which is 2,7-bis(3-piperidinopropoxy)fluoren-9-one or a pharmaceutically acceptable acid addition salt thereof.

27. A base compound of claim 6 which is 2,7-bis[2-(diisopropylamino)ethoxy]fluoren-9-one or a pharmaceutically acceptable acid addition salt thereof.

References Cited

UNITED STATES PATENTS

| | | | |
|---|---|---|---|
| 1,915,334 | 6/1933 | Salzberg et al. | 260—243 |
| 3,083,201 | 3/1963 | Anderson | 260—268TRI |
| 3,146,259 | 8/1964 | Anderson | 260—268TRI |

OTHER REFERENCES

Chemical Abstracts, vol. 62; 16159b, Khmeleoskii et al., June 1965.

The Chemistry of Heterocyclic Compounds, John Wiley & Sons, Interscience Publishers (1962), "5 and 6 membered compounds with N and O," A. Quilico, page 229.

HENRY R. JILES, Primary Examiner

S. D. WINTERS, Assistant Examiner

U.S. Cl. X.R.

260—246B, 293.4D, 268TR, 326.5C, 326.5S, 326.84, 570.5P, 570.5S; 424—248, 250, 267, 274, 330; 360—590, 619B.